US009227665B2

(12) United States Patent
Mildner et al.

(10) Patent No.: US 9,227,665 B2
(45) Date of Patent: Jan. 5, 2016

(54) MOTOR VEHICLE WITH MODULAR BODY

(71) Applicant: GM GLOBAL TECHNOLOGY OPERATIONS LLC, Detroit, MI (US)

(72) Inventors: Udo Mildner, Limburg (DE); Juergen Hulbert, Eltville (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/090,349

(22) Filed: Nov. 26, 2013

(65) Prior Publication Data
US 2014/0159430 A1 Jun. 12, 2014

(30) Foreign Application Priority Data

Nov. 28, 2012 (DE) .......................... 10 2012 023 674

(51) Int. Cl.
*B62D 25/02* (2006.01)
*B62D 24/02* (2006.01)
*B62D 25/04* (2006.01)
*B62D 25/08* (2006.01)
*B62D 29/00* (2006.01)
*B62D 27/02* (2006.01)

(52) U.S. Cl.
CPC .............. *B62D 25/04* (2013.01); *B62D 25/082* (2013.01); *B62D 25/085* (2013.01); *B62D 27/023* (2013.01); *B62D 29/00* (2013.01)

(58) Field of Classification Search
CPC ...... B62D 25/04; B62D 25/08; B62D 25/082; B62D 25/085; B62D 29/00; B62D 27/023; B60R 2011/0038
See application file for complete search history.

(56) References Cited

U.S. PATENT DOCUMENTS

| 7,048,325 | B1 | 5/2006 | Sandhu |
| 8,596,711 | B2 * | 12/2013 | Yasui et al. ............... 296/187.09 |
| 8,876,194 | B2 * | 11/2014 | Dix et al. ................. 296/187.09 |
| 2005/0046237 | A1 | 3/2005 | Miyoshi et al. |
| 2006/0028054 | A1 | 2/2006 | Dettinger et al. |

FOREIGN PATENT DOCUMENTS

| DE | 19941907 A1 | 3/2000 |
| DE | 102006009902 A1 | 9/2007 |
| DE | 102010005835 A1 | 7/2011 |
| DE | 102010013842 A1 | 10/2011 |
| EP | 0297057 B1 | 6/1992 |

(Continued)

OTHER PUBLICATIONS

Intellectual Property Office, Search Report under Section 17 for United Kingdom Patent Application No. GB1319862.7, issued Apr. 15, 2014.

(Continued)

*Primary Examiner* — Alexander P Taousakis
(74) *Attorney, Agent, or Firm* — Ingrassia Fisher & Lorenz PC

(57) ABSTRACT

A motor vehicle is provided that has a central front wall arranged between engine compartment and passenger cell and lateral front walls, each of which comprises first contact points for fastening to the central front wall and second contact points for fastening to a lateral sill structure. Of the lateral front walls, multiple models are provided, which differ with respect to the spacing between first and second contact points measured in transverse direction of the motor vehicle body.

12 Claims, 4 Drawing Sheets

(56) References Cited

FOREIGN PATENT DOCUMENTS

| | | | |
|---|---|---|---|
| EP | 1437291 | A2 | 7/2004 |
| WO | 2011120682 | A1 | 10/2011 |

OTHER PUBLICATIONS

German Patent Office, German Patent Search Report for Application No. 102012023674.3, mailed Aug. 14, 2013.

* cited by examiner

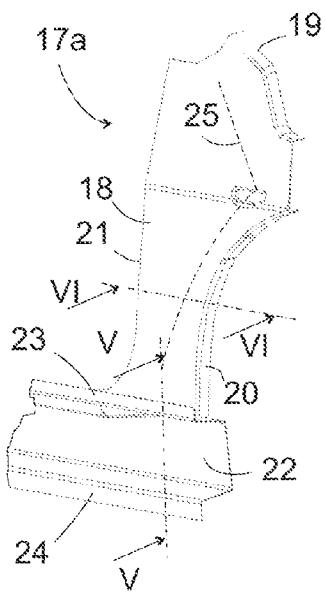 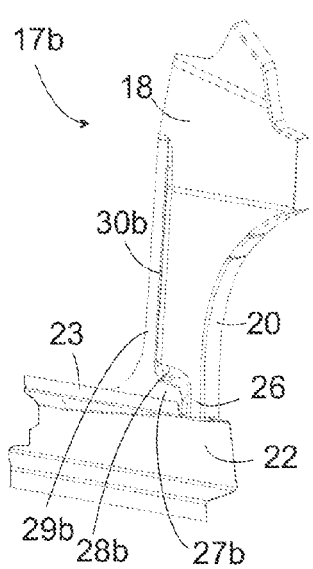 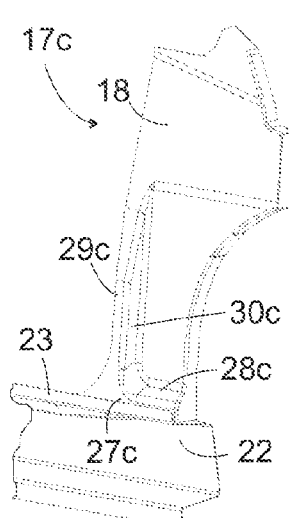
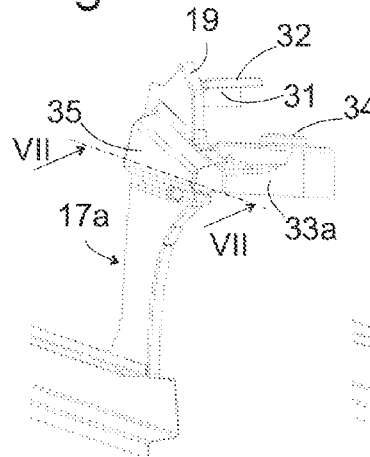 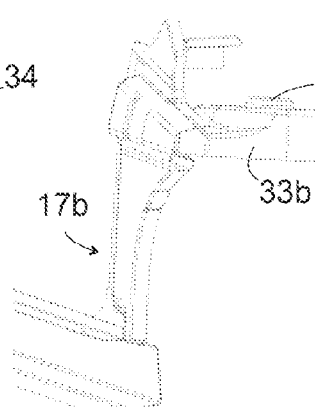 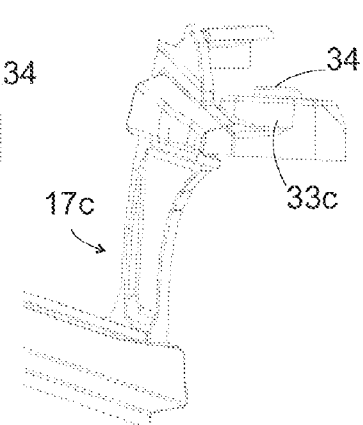

MOTOR VEHICLE WITH MODULAR BODY

CROSS-REFERENCE TO RELATED APPLICATION

This application claims priority to German Patent Application No. 10 2012 023 674.3, filed Nov. 28, 2012, which is incorporated herein by reference in its entirety.

TECHNICAL FIELD

The technical field relates to a motor vehicle with a modularly structured body.

BACKGROUND

From DE 10 2010 013 842 A1 a body structure for a motor vehicle is known, in which a model-specific spring strut mounting module is combined with body structure elements that are identical across models. The modification of the spring strut mounting module makes possible realizing wheel controls and chassis characteristics which differ from model to model. With the different spring strut mounting modules, different axle lengths would also be realizable in principle. Different body widths that are suitable for the axle length however cannot be realized with the known structure.

At least one object is to create a motor vehicle front part that makes possible realizing motor vehicles with different body widths with a low number of model-specific components. In addition, other objects, desirable features and characteristics will become apparent from the subsequent summary and detailed description, and the appended claims, taken in conjunction with the accompanying drawings and this background.

SUMMARY

A motor vehicle front part is provided with a central front wall arranged between engine compartment and passenger cell, lateral front walls, each of which comprise first contact points for fastening to the central front wall and second contact points for fastening to a lateral sill structure, are provided in a plurality of models, which differ with respect to the spacing between first and second contact points measured in transverse direction of the motor vehicle body. The lateral front walls each comprise a baseplate, which in contrast with the central front wall, substantially stands perpendicularly on the vehicle transverse direction.

The first contact point connecting to the central front wall can be provided in a central region of the baseplate. In a first model of the lateral front wall, a lower marginal strip of the baseplate can form the second contact point. In a second model of the lateral front wall, a lower marginal strip forming the second contact point however is connected to the baseplate via an offset zone. As the offset zone is deflected against the baseplate towards the vehicle interior or to the outside, spacing of the sill structures which are smaller or larger than with the first model and thus also correspondingly different widths of the body of the vehicle according to the invention can be realized. On a front margin of the baseplate, a third contact point is provided for fastening a wheel installation housing.

In order to establish a large-area, flexurally rigid connection to the wheel installation housing, a flange can be angled off the front margin of the baseplate. The third contact point or the flange then extends preferentially arc-like along a wall of the wheel installation housing. Additionally, a rear marginal strip of the lateral front wall can be laterally offset against the baseplate for adapting to different body widths. A side wall structure of the motor vehicle is then preferentially fastened to this rear marginal strip.

The lower marginal strip and the rear marginal strip are laterally offset relative to the baseplate each in the same direction, possibly also to the same, in order to also realize a large (small) spacing of the side wall structures in the case of a body with large (small) spacing of the sill structure. The side wall structure can in particular comprise a front fender or a component, on which a front fender is directly or indirectly fastened, such as for example an outer wheel installation strut, a hinge pillar or at least parts of these.

BRIEF DESCRIPTION OF THE DRAWINGS

The present invention will hereinafter be described in conjunction with the following drawing FIGS., wherein like numerals denote like elements, and:

FIG. 3A to FIG. 3C are views of different models of a lateral front wall, which can be combined with the front part of the motor vehicle of FIG. 1, in order to form bodies of different width;

FIG. 4A to FIG. 4C care the different models of the lateral front wall from FIG. 3 with further model-specific parts attached thereto;

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
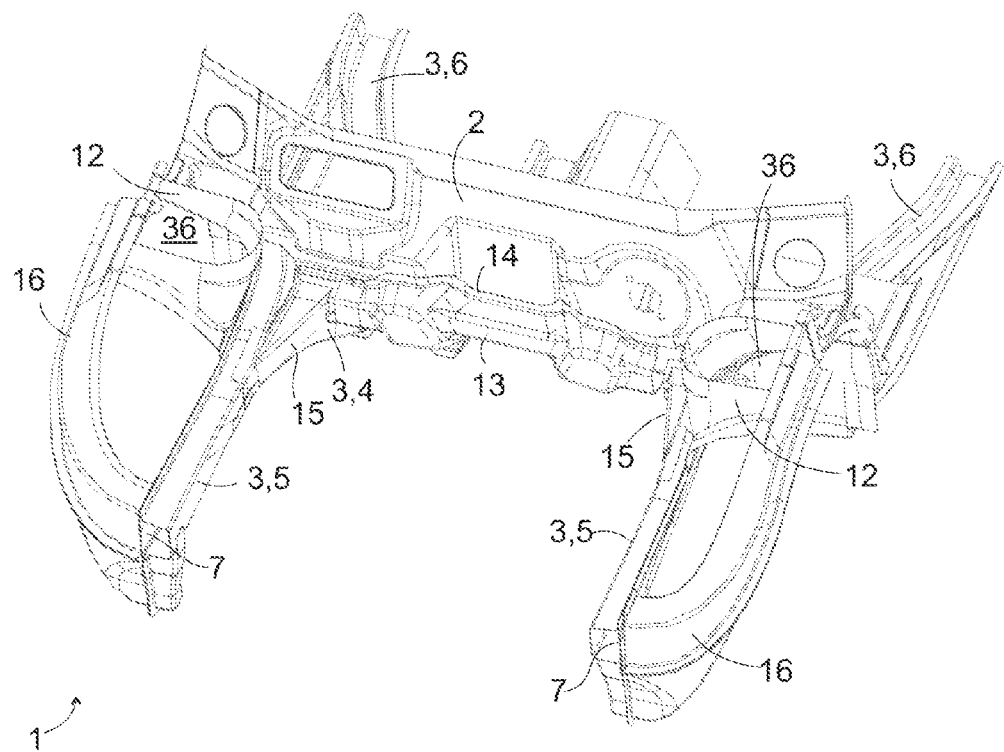
FIG. 1 a perspective view of a front part of a motor vehicle according to an embodiment omitting model-specific parts.

The view of FIG. 1 shows an incomplete motor vehicle front part 1. The representation does not correspond to an actual intermediate space during the production of the motor vehicle; it merely shows a plurality of body parts in the position relative to one another, which they also assume in the finished vehicle. A central front wall 2 is provided in order to separate engine compartment and passenger cell from one another in the finished vehicle.

Two side members 3 each have a middle portion 4, which in the FIG. is concealed for the greatest part, and which is welded to a lower region of the front wall 2 that obliquely drops towards the back, front portions 5 substantially projecting from the front wall 2 horizontally to the front and rear portions 6, which are provided in order to support a floor panel of the passenger compartment in the finish-assembled vehicle. The side members 3 each have a top hat-shaped cross section, whose concave side in its front portions 5 is laterally oriented to the outside and is closed off by an elongated plate 7 welded along upper and lower margins of the top hat cross section to the front portion 5. In the middle portion 4, the concave side of the side members faces the front wall 2, so that the front wall complements the side members 3 in the middle portion 4 into a hollow profile. In the rear portion 6, the concave side, as is evident in the FIG., faces upwards and in the finish-assembled state, closed off through the floor panel of the passenger cell which is not shown here.

Figure 2:
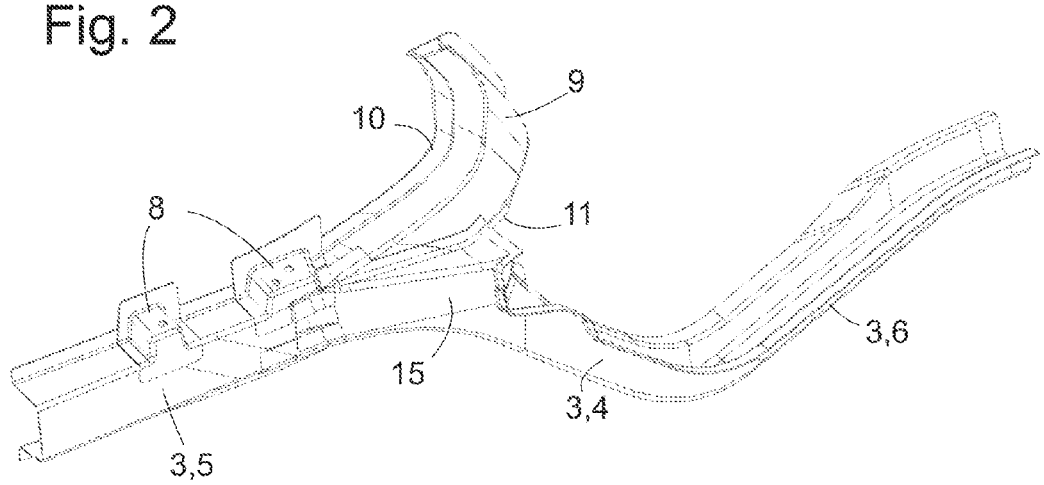
FIG. 2 is a side member of the front part of the vehicle from FIG. 1.

FIG. 2 shows the left side member 3 from FIG. 1 separated from the central front wall 2. Bearing pedestals 8 on an upper flank of the front portion 5 are provided for mounting an engine and transmission which are not shown in the figures. At the transition between front portion 5 and middle portion 4 of the side member 3, a reinforcing portion 9 is joined, which extends in an arc to the back and laterally to the outside. The reinforcing portion 9 also has a top hat-like cross section with upper and lower elongated loading flanges 10, 11, which at the assembly stage shown in FIG. 1, are welded to a wheel installation housing 12.

A cross member 13 extends on the central front wall 2 between the two side members 3. The cross member 13 also has a substantially top hat-like cross section, wherein a concave side of the cross section faces the central front wall 2 and upper and lower welding flanges of the cross member 13 (of which in FIG. 1 only an upper welding flange 14 is visible) are welded to the central front wall 2 in order to form a hollow profile with closed cross section. The cross member 13 meets the side members 3 in each case at a height defined by them and the reinforcing portion 9, and the connection between side members and cross members is stiffened through a gusset plate 15, of which a front region is welded to the side member 3 and the stiffening portion 9 and a rear region forms a mounting engaging about the cross member 13 in a positively joined manner.

Wheel installation struts 16 extend from the front tips of the side members 3 as far as into the vicinity of the lateral margins of the central front wall 2. A gap between them and the adjacent side members is each filled out by one of the wheel installation housings 12, except for an opening on the apex of the wheel installation housing 12, which is provided in order to receive a spring strut dome 33 (see FIG. 4 and FIG. 8).

In order to realize motor vehicle bodies that are different in width with the help of the assembly shown in FIG. 1 it is provided according to the invention to combine these with different models of lateral front walls 17a, 17b, 17c, which in the FIG. 3a to FIG. 3c are each shown in a perspective view. The lateral front wall 17a from FIG. 3a comprises a substantially planar baseplate 18, based on the normal movement direction of the vehicle, on the front margin of which flanges 19, 20 are angled off in one piece. The lower one of the two flanges, 20, is provided for fastening the wheel installation housing 12, as will still be explained in more detail later on, the upper flange 19 can serve as support for a windshield of the vehicle in the finish-assembled state. On the other side of a rear margin 21 of the lateral front wall 17a, a door opening will be located after the completion of the vehicle.

From a lateral sill structure, which in the finished vehicle will limit the door opening towards the bottom, only a profile 22 of top hat-like cross section that is open towards the outside is shown in FIG. 2a. Upper and lower elongated welding flanges 23, 24 of the profile 22 will be welded to a planar or complementarily top hat-like profile that is not shown following completion, in order to form a sill with closed cross section. A front end of the upper welding flanges 23 is welded to a lower marginal strip of the baseplate 18, so that baseplate 18 and welding flange 23 substantially extend in a same plane that is substantially perpendicular to the vehicle transverse direction.

The lateral front wall 17a is provided in order to be welded to a lateral margin of the central front wall 2 approximately along a dash-dotted line 25 on its side facing away from the beholder in FIG. 3a. FIG. 3b shows a second model, designated 17b, of the lateral front wall in a view that is analogous to FIG. 3a. The flanges 19, 20 on the front margin of the baseplate 18 do not substantially differ from those shown in FIG. 3a. The welding flange 23 of the profile 22 in the configuration of FIG. 3b is slightly shortened at its front end, so that other than with the model of FIG. 3a it does not reach directly up to the flange 20, but is separated from the latter through a narrow downwardly directed extension 26 of the baseplate 18.

A lower marginal strip 27b is joined in one piece to the baseplate 18 via an offset zone 28b. The welding flange 23 is welded to the lower marginal strip 27b. On the rear margin of the lateral front wall 17b, a rear marginal strip 29 substantially extends vertically. It lies in a same plane with the marginal strip 27b and like the latter, is unitarily joined to the baseplate 18 via an offset zone 30b. The marginal strip 27b is offset against the baseplate 18 towards the vehicle interior. With given width of the front wall 2, a reduced spacing between the profiles 22 is obtained on the sides of the passenger cell of the finished vehicle if instead of the lateral front wall 17a of FIG. 3a the lateral front wall 17b of FIG. 3b is installed.

Analogously, the lateral front wall 17c shown in FIG. 3c also has a lower marginal strip 27 that is laterally deflected relative to the baseplate 18 and a rear marginal strip 29c. The direction of the deflection in this case however is opposite to that in the case of the lateral front wall 17b, so that when using lateral front walls 17c on both sides of the vehicle, the spacing between the profiles 22 increases. In this way, bodies of different width can be realized in a simple manner, even if all components of the body (and not only these) shown in FIG. 1 are identical. Since the course of the line 25 is predetermined through the contour of the central front wall 2 and is the same in all models of the lateral front wall, the line 25 in FIGS. 3b and 3c has been omitted.

FIG. 4a shows the lateral front wall 17a, complemented by a few further components. These include a lateral window support 31, the angled-off front margin 32 of which comes to lie in a plane with the flange 19 which likewise supports the windshield later on, and a spring strut dome 33a, which in the inserted state covers the apex opening 36 of the wheel installation housing 12, and an extension piece 35, which extends the wheel installation strut 16 towards the back.

Since the wheel installation housing 12 and the wheel installation struts are model-independently identical and the spacing between the baseplates 18 is also model-independently the same, the shape of the apex opening 36 is also identical. The different models of the spring strut dome 33a, 33b, 33c shown in FIG. 4a to FIG. 4c therefore merely differ in the position of an opening 34 of the spring strut dome, in which in the finished vehicle the spring strut is anchored. As the spacing between the openings 36 of the two spring strut domes varies corresponding to the offset between baseplate 18 and marginal strips 27a, b, c of the various models from lateral front walls 17a, b, c, a uniformly favorable driving and steering behavior can be achieved despite different body widths and axle lengths.

Figure 5:
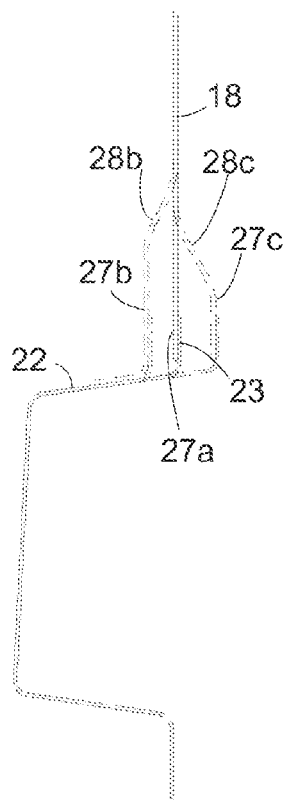
FIG. 5 is a section along the line V-V from FIG. 3.

FIG. 5 shows with continuous lines a section along the plane V-V of FIG. 3a running vertically in vehicle transverse direction. Interrupted lines in each case illustrate deviations which would result in a corresponding section in the case of the lateral front walls 17b, 17c and of FIG. 3b, FIG. 3c) respectively. In the case of the lateral front wall 17a, a marginal strip 27a, which is welded to the welding flange 23 of the profile 22, lies in a plane with the baseplate 18, resulting in the continuously drawn cross-sectional course of the profile 22. When using the lateral front wall 17b, the marginal strip 27b is offset towards the vehicle interior, to the left in FIG. 5, and the profile 22 is also offset vehicle-inwardly accordingly. For the sake of clarity, only the welding flange 23 is shown of the offset profile. Accordingly, when using the lateral front wall 17c, the profile 22 is shifted towards the vehicle outside.

Figure 6:
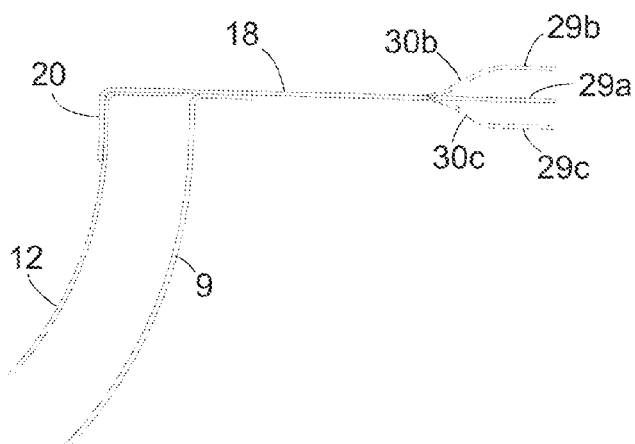
FIG. 6 is a horizontal section along the line VI-VI from FIG. 3.

FIG. 6 shows a section along the plane VI-VI from FIG. 3a running horizontally in vehicle transverse direction or, in turn in interrupted line representation, along corresponding planes of the FIG. 3b, FIG. 3c. Here, too, the different lateral offset between baseplate 18 and the vertical rear marginal strips 29a, 29b and 29c is clearly visible. Connecting the wheel installation housing 12 and the reinforcing portion 9 extending round about the wheel installation housing is identical with all models of the lateral front wall.

Figure 7:
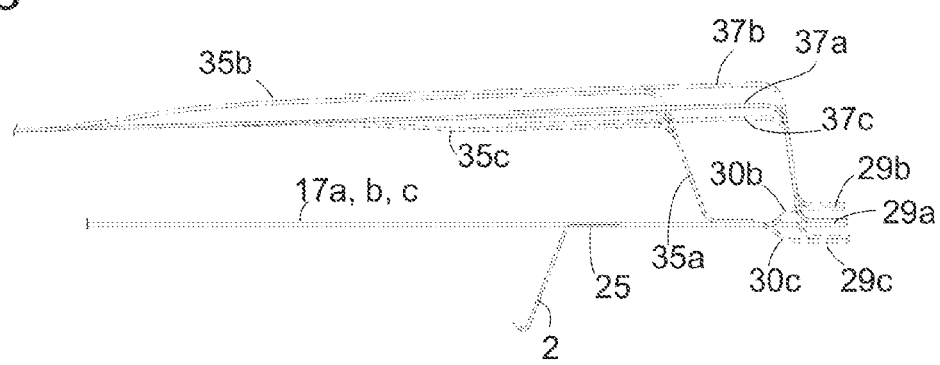
FIG. 7 is a section along the line VII-VII from FIG. 4.

The section plane of FIG. 7 lies higher than that of FIG. 6, and accordingly, the offset between the baseplate 18 and the marginal strips 29a, 29b and 29c is slightly smaller. The extension pieces 35a, b and c are each welded to the baseplate 18 of the lateral front walls 17a, b and c; in order to realize bodies of different width also at the height of this section plane, there are different models also of the extension pieces 35a, b, c, which differ in particular in their dimensions in vehicle transverse direction. A rearward region of the extension pieces 35a, b and c is concealed here by a hinge pillar reinforcement 37a, b and c, a vertically elongated sheet metal profile of Z-like cross section.

Figure 8:
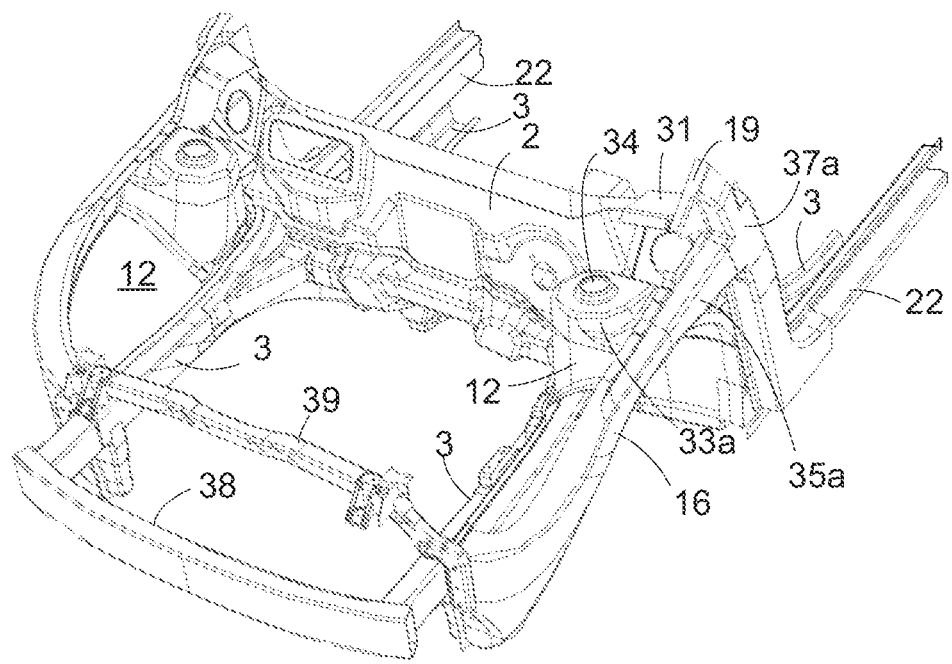
FIG. 8 is the front part of the motor vehicle from FIG. 1 completed through addition of the lateral front wall and other parts.

FIG. 8 shows the front part of the vehicle of FIG. 1, completed through addition of the components shown in FIG. 4a and some more. The extension piece 35a bridges an intermediate space between the rear end of the wheel installation strut 16 and the—here hidden under the hinge pillar reinforcement 37a, lateral front wall 17a. The front ends of the side members 3 and wheel installation strut 16 are connected through a bumper cross member 38 and a hood lock support 39.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method of manufacturing a motor vehicle, comprising: providing a central front wall and a lateral sill structure; providing a pair of opposing lateral front walls, each having a baseplate and a marginal strip, wherein the baseplate extends between a first contact point with the central front wall and a second contact point of the marginal strip and the lateral sill structure, the first contact point being fixed at a first transverse vehicle position and the second contact point being fixed at a second vehicle transverse position to define a vehicle width, and wherein the vehicle width defined by the second contact point of the marginal strip depends on a model of motor vehicle to be manufactured; and
fastening the pair of opposing lateral front walls to the central front wall and lateral sill structure, in order to obtain the motor vehicle.

2. The method according to claim 1, further comprising perpendicularly arranging the baseplates of each of the pair of opposing lateral front walls on a vehicle transverse direction.

3. The method according to claim 2, wherein the first contact point of the pair of opposing lateral front walls is located in a central region of the baseplate.

4. The method according to claim 2, wherein the marginal strip is a lower marginal strip.

5. The method according to claim 2, further comprising: forming the second contact point with a lower marginal strip at the baseplate via an offset zone to define the vehicle width depending on the model of motor vehicle to be manufactured.

6. The method according to claim 2, further comprising providing a third contact point on a front margin of the baseplate for fastening a wheel installation housing.

7. The method according to claim 6, wherein the front margin has an angled flange.

8. The method according to claim 6, wherein the third contact point extends arc-like along a wall of the wheel installation housing.

9. The method according to claim 2, further comprising fastening the baseplate in a side wall structure to a rear marginal strip on the pair of lateral front walls that is laterally offset against the baseplate.

10. The method according to claim 9, wherein a lower marginal strip and the rear marginal strip are laterally offset in a substantially similar direction.

11. The method according to claim 10, wherein the side wall structure is at least a part of a wheel installation strut.

12. The method according to claim 10, wherein the side wall structure is at least a part of a hinge pillar.

* * * * *